United States Patent [19]

Morita

[11] Patent Number: 4,679,536
[45] Date of Patent: Jul. 14, 1987

[54] ENGINE COMBUSTION CONDITION DETECTING SYSTEM AND METHOD

[75] Inventor: Tatsuo Morita, Yokosuka, Japan

[73] Assignee: Nissan Motor Company, Limited, Kanagawa, Japan

[21] Appl. No.: 781,665

[22] Filed: Sep. 30, 1985

[30] Foreign Application Priority Data

Nov. 28, 1984 [JP] Japan ............................ 59-249468

[51] Int. Cl.⁴ .............................................. F02P 5/04
[52] U.S. Cl. ..................................... 123/425; 123/435
[58] Field of Search ................................ 123/425, 435

[56] References Cited

U.S. PATENT DOCUMENTS

| | | | |
|---|---|---|---|
| 3,875,912 | 4/1975 | Bucco | 123/425 |
| 3,942,491 | 3/1976 | Seite | 123/425 |
| 3,957,023 | 5/1976 | Peterson | 123/425 |
| 4,054,111 | 10/1977 | Sand | 123/425 |
| 4,131,097 | 12/1978 | Sawada | 123/425 |
| 4,153,019 | 5/1979 | Laubenstein | 123/425 |
| 4,449,501 | 5/1984 | Greeves | 123/425 |
| 4,455,980 | 6/1984 | Sasayama | 123/425 |

*Primary Examiner*—Ronald B. Cox
*Attorney, Agent, or Firm*—Schwartz, Jeffery, Schwaab, Mack, Blumenthal & Evans

[57] ABSTRACT

Pressure within an engine combustion chamber is sensed. The timing at which the sensed pressure peaks is detected, and the interval between the moment of spark generation and the detected timing of the pressure peak is measured. The presently detected timing of the pressure peak is selectively adopted or ignored in accordance with the measured interval. When the presently detected timing of the pressure peak is ignored, the previously accepted timing value of the pressure peak is adopted in its place.

12 Claims, 15 Drawing Figures

ENGINE COMBUSTION CONDITION DETECTING SYSTEM AND METHOD

BACKGROUND OF THE INVENTION

1. Field of the Invention

This invention relates to a system for and a method of detecting the condition of combustion in an engine.

2. Description of the Prior Art

In spark ignition internal combustion engines, spark timing closely relates to engine power output. The timing at which the pressure in the engine combustion chamber peaks depends on the spark timing. It is known to adjust spark timing so that the timing at which the pressure in the engine combustion chamber peaks coincides with a preset engine crank angle, thereby achieving optimal engine power output performance.

The December 1976 issue of the Journal of Dynamic Systems, Measurement, and Control, pages 414-420, discloses such a spark timing control system.

SAE (Society of Automotive Engineers) document No. 790139 suggests a similar control system.

These spark timing control systems include device for detecting the timing at which the pressure in the engine combustion chamber reaches its maximal level.

When spark timing is excessively retarded or an excessively rich or lean air-fuel mixture is supplied to the engine, the peak or maximal pressures sometimes do not result from combustions.

SUMMARY OF THE INVENTION

It is an object of this invention to provide an accurate engine combustion condition detecting system and method.

In accordance with this invention, pressure within an engine combustion chamber is sensed. The timing at which the sensed pressure peaks is detected, and the interval between the moment of spark generation and the detected timing of the pressure peak is measured. The presently detected timing of the pressure peak is selectively accepted or rejected in accordance with the detected interval. When the presently detected timing of the pressure peak is rejected, the previously accepted timing of the pressure peak is used in its place.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
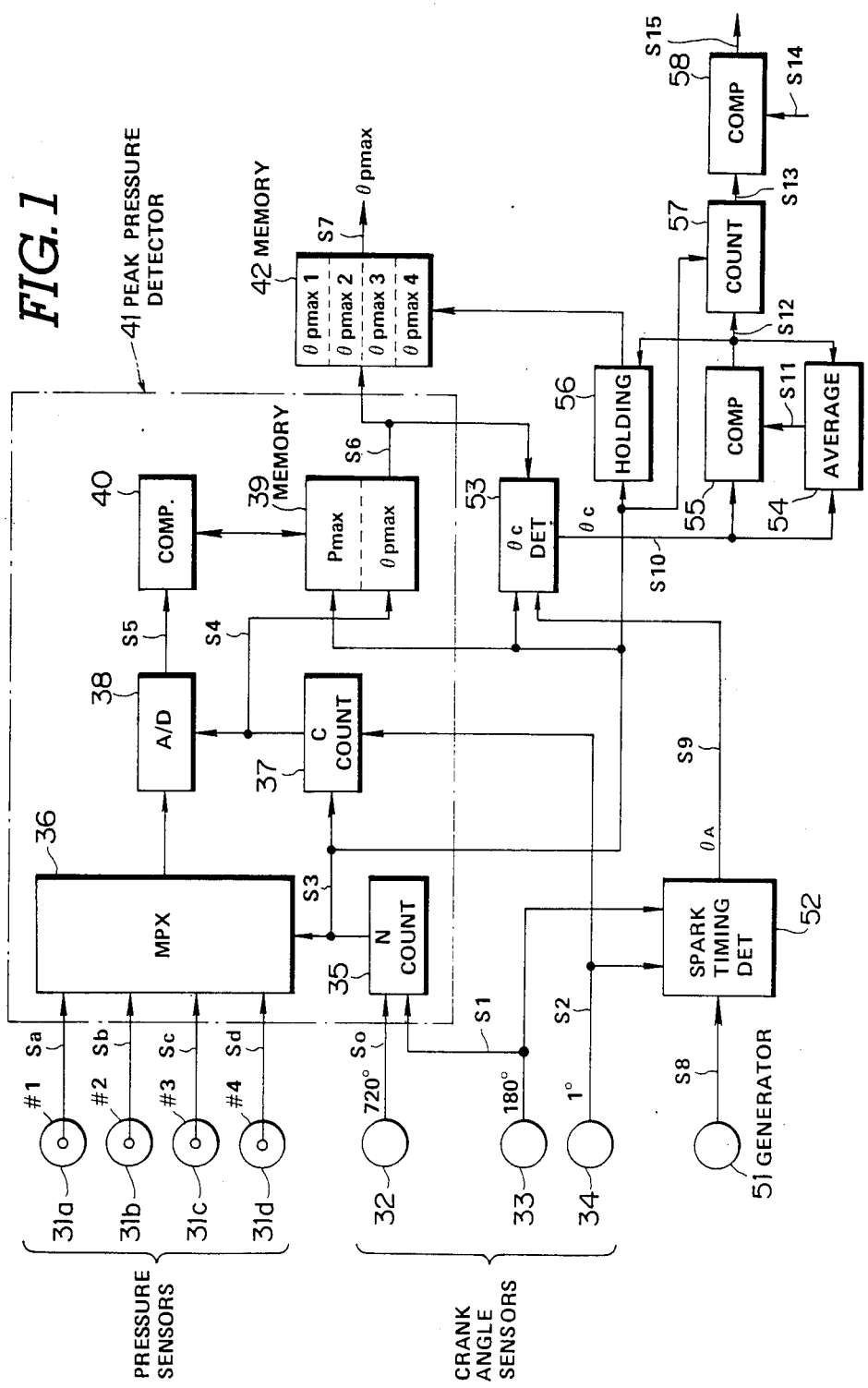
FIG. 1 is a block diagram of an engine combustion condition detecting system according to a first embodiment of this invention.

With reference to FIG. 1, a four-cycle internal combustion engine of the spark ignition type has first, second, third, and fourth cylinders or combustion chambers #1, #2, #3, and #4. The ignition order for the engine cylinders is #1-#3-#4-#2. Pressure sensors 31a, 31b, 31c, and 31d connected to the engine cylinders #1, #2, #3, and #4 generate signals Sa, Sb, Sc, and Sd representing the pressures in the combustion chambers #1, #2, #3, and #4, respectively. Specifically, the voltages of the signals Sa-Sd depend on the pressures in the corresponding combustion chambers.

The pressure sensors 31a-31d may be in the form of a washer fixed to the engine cylinder head together with spark plugs. The pressure sensors 31a-31d may include a piezoelectric element converting the combustion chamber pressures into electrical signals from which the pressure signals Sa-Sd are derived.

A fist crank angle sensor 32 generates a reference pulse S0 with each two rotations of the crankshaft of the engine. Accordingly, the pulses S0 are spaced at equal intervals representing 720° of crank angle. The rising edge of each 720° pulse S0 coincides with the top dead center of the compression engine operation stroke of a preselected engine cylinder or precedes the top dead center by a preset crank angle interval, e.g., 70°.

A second crank angle sensor 33 generates a reference pulse S1 each time the engine crankshaft rotates through 180°. Accordingly, the pulses S1 are spaced at equal intervals representing 180° of crank angle. The rising edges of the 180° pulses S1 may coincide with the top dead center of the compression engine operation stroke of each engine cylinder or precede the top dead center by a preset crank angle interval, e.g., 70°. Thus, the 720° pulse S0 is synchronous with one of each four 180° pulses S1.

In the case of an n-cylinder engine, the second crank angle sensor 33 generates pulses spaced at regular crank angle intervals equal to 720°/n, where n represents the number of cylinders.

A third crank angle sensor 34 generates a reference pulse S2 each time the engine crankshaft rotates through 2°. Accordingly, the pulses S2 are spaced at equal intervals representing 2° of crank angle. The duration or width of each pulse S2 is 1° in terms of crank angle, so that the rising and falling edges of the pulses S2 are spaced at equal intervals representing 1° of crank angle. In this way, the reference signal pulses S2 signify each 1° of crank angle.

A peak-pressure detector 41 includes an N-counter 35, a multiplexer (MPX) 36, a C-counter 37, an analog-to-digital (A/D) converter 38, a memory 39, and a comparator 40.

The N-counter 35 is connected to the crank angle sensors 32 and 34 to receive the 720° pulse S0 and the 180° pulse S1. The N-counter 35 generates a digital signal S3 representative of a number which is incremented by one each time the N-counter 35 receives the rising edge of a 180° pulse S1. The N-counter 35 is reset or cleared to a preset initial value each time it receives the rising edge of a 720° pulse S0. Accordingly, the digital signal S3 periodically assumes each of four different states representing corresponding operation phases of the four engine cylinders. These four states are represented by the numbers "0", "1", "2", and "3" respectively.

The multiplexer 36 is connected to the pressure sensors 31a–31d to receive the pressure signals Sa–Sd. Also, the multiplexer 36 is connected to the A/D converter 38. A selected one of the pressure signals Sa–Sd can pass through the multiplexer 36 to the A/D converter 38 as described hereinafter. The multiplexer 36 has a selection control terminal which is connected to the N-counter 35 to receive the digital signal S3. When the digital signal S3 reads "0", only the pressure signal Sa for the first cylinder #1 is passed by the multiplexer 36 to the A/D converter 38. When the digital signal S3 reads "1", only the pressure signal Sc for the third cylinder #3 is passed by the multiplexer 36 to the A/D converter 38. When the digital signal S3 reads "2", only the pressure signal Sd for the fourth cylinder #4 is passed by the multiplexer 36 to the A/D converter 38. When the digital signal S3 reads "3", only the pressure signal Sb for the second cylinder #2 is passed by the multiplexer 36 to the A/D converter 38.

The C-counter 37 is connected to the N-counter 35 and the crank angle sensor 34 to receive the digital signal S3 and the 1° signal S2. The C-counter 37 generates a digital signal S4 representative of a number which is incremented by one each time the C-counter 37 receives either of the rising and falling edges of a pulse S2. Accordingly, the number represented by the digital signal S4 is incremented by one each time the engine crankshaft rotates through 1°. The C-counter 37 is reset or cleared to a preset initial value each time the digital signal S3 changes from one state to another.

The A/D converter 38 has a control terminal which is connected to the C-counter 37 to receive the digital signal S4. Each time the digital signal S4 changes from one state to another, the A/D converter 38 samples the analog pressure signal passed through the multiplexer 36 and converts it into a corresponding digital signal S5.

The memory 39 includes a first segment storing digital data representing the pressure in the combustion chamber and a second segment storing digital data representing the crank angle. The memory 39 is connected to the counters 35 and 37 to receive the digital signals S3 and S4. Each time the digital signal S3 changes from one state to another, the pressure value held in the first memory segment is cleared or initialized to a zero pressure value. The second memory segment holds the digital signal S4 representing the crank angle.

The comparator 40 is connected to the A/D converter 38 to receive the digital pressure signal S5. The comparator 40 is also connected to the pressure storing segment of the memory 39. The comparator 40 determines whether or not the pressure value represented by the signal S5 exceeds the pressure value held in the memory 39. If the pressure value represented by the signal S5 does not exceed the held pressure value, the comparator 40 does not act on the memory 39. If the pressure value represented by the signal S5 exceeds the held pressure value, the comparator 40 updates the pressure value held in the memory 39 by loading the pressure value represented by the signal S5 into the pressure storing segment of the memory 39 in place of the previous pressure value. At the same time, the comparator 40 allows the crank angle storing segment of the memory 39 to hold the crank angle represented by the signal S4. The memory 39 outputs a digital signal S6 representing the crank angle value held in its second segment.

As a result of cooperation between the memory 39 and the comparator 40, the first segment of the memory 39 holds the peak or maximum pressure value Pmax and the second segment of the memory 39 holds the crank angle value $\theta$pmax at which the peak pressure occurs.

A memory 42 is connected to the memory 39 to receive the signal S6 representing the peak pressure crank angle $\theta$pmax. The memory 42 has four segments to hold corrected peak pressure crank angles $\theta$pmax1, $\theta$pmax2, $\theta$pmax3, and $\theta$pmax4 for the engine cylinder #1, #2, #3, and #4 respectively. The memory 42 is connected to the N-counter 35 by way of a holding circuit 56 to receive the signal S3. It should be noted that the holding circuit 56 will be described in detail hereinafter. Each time the signal S3 changes from one state to another, one of the values held in the memory 42 is updated. In cases where the 180° pulses precede the top dead center of the compression strokes by 70°, the memory 42 holds a value equal to the peak pressure crank angle $\theta$pmax minus 70. When the signal S3 is "0", the memory segment for the first engine cylinder #1 stores the corrected peak pressure crank angle $\theta$pmax1 derived from the peak pressure crank angle $\theta$pmax represented by the signal S6. When the signal S3 is "1", the memory segment for the third engine cylinder #3 stores the corrected peak pressure crank angle $\theta$pmax3 derived from the peak pressure crank angle $\theta$pmax represented by the signal S6. When the signal S3 is "2", the memory segment for the fourth engine cylinder #4 stores the corrected peak pressure crank angle $\theta$pmax4 derived from the peak pressure crank angle $\theta$pmax represented by the signal S6. When the signal S3 is "3", the memory segment for the second engine cylinder #2 stores the corrected peak pressure crank angle $\theta$pmax2 derived from the peak pressure crank angle $\theta$pmax represented by the signal S6. The memory 42 generates a digital signal S7 representing the held crank angles $\theta$pmax1, $\theta$pmax2, $\theta$pmax3, and $\theta$pmax4.

A generator 51 outputs spark control pulses S8, the falling edges of which determine spark timing. In other words, a spark is induced in the engine combustion chamber at the falling edge of each spark pulse S8. The rising edge of each spark pulse S8 may alternatively determine spark timing. It should be noted that the generator 51 may include a conventional spark control circuit for an internal combustion engine.

A spark-timing detector 52 is connected to the crank angle sensors 33 and 34, and to the generator 51 to receive the 180° signal S1, the 1° signal S2, and the spark signal S8. The detector 52 includes a counter which records the total number of rising and falling edges of the 1° signal S2 during the interval between the rising edge of the 180° pulse S1 and the falling edge of the subsequent spark pulse S8. The detector 52 outputs a signal S9 representing spark timing $\theta A$ relative to the 180° pulse S1, the signal S9 being derived from the total pulse-edge count.

In cases where the rising edge of each 180° pulse S1 precedes the top dead center of the compression stroke by 70°, the spark timing $\theta A$ is given by the following equation:

$$\theta A = 70 - C,$$

where C represents the total numer of pulse edges counted by the counter in the detector 52.

In cases where the generator 51 includes a conventional spark control circuit deriving a signal representing spark timing, this signal is used as the spark-timing signal S9 and the spark-timing detector 52 is omitted.

An interval detector 53 is connected to the N-counter 35, the memory 39, and the spark-timing detector 52 to receive the signals S3, S6, and S9. When the digital signal S3 changes from one state to another, the detector 53 records the crank angle interval $\theta c$ between the spark timing $\theta A$ and the peak pressure crank angle $\theta pmax$. Accordingly, the crank angle interval $\theta c$ is measured for each combustion episode. Specifically, the crank angle interval $\theta c$ is given by the following equation:

$$\theta c = \theta A + \theta pmax$$

Figure 2:
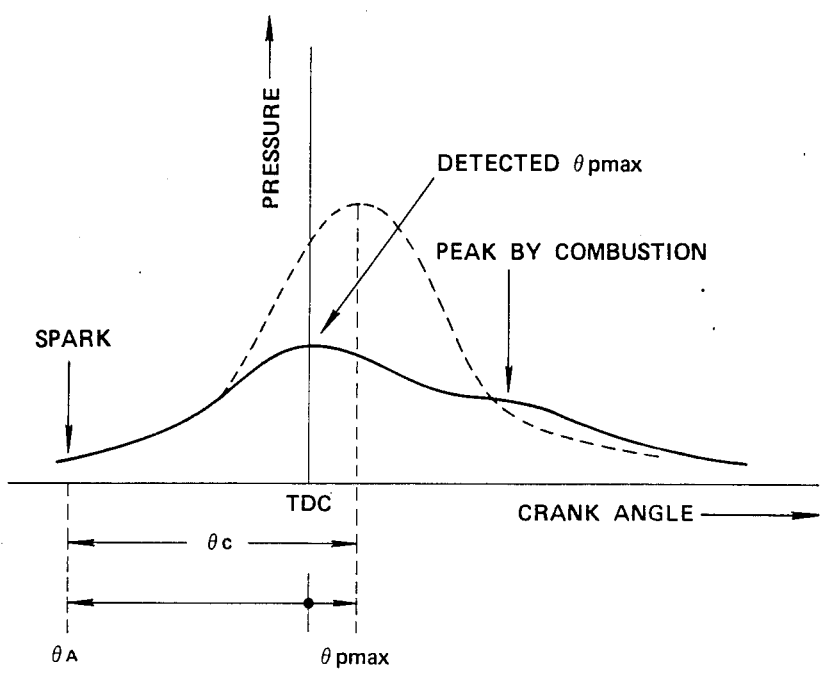
FIG. 2 is a graph of typical relationships between pressure within engine cylinder and crank angle.

It should be noted that the crank angle values $\theta A$ and $\theta pmax$ are of opposite sign, as shown in FIG. 2. The interval detector 53 generates a digital signal S10 representing the measured crank angle interval $\theta c$.

As shown by the broken curve in FIG. 2, under normal combustion conditions, the pressure within the engine combustion chambers varies with crank angle along a leptokurtic curve. In these normal cases, the measured crank angle interval $\theta c$ accurately reflects the combustion rate. As shown by the solid curve in FIG. 2, under unacceptable or non-optimal combustion conditions, the pressure within the engine combustion chambers varies with crank angle along a platykurtic curve. In these unacceptable cases, the pressure reaches its maximal level at around the top dead center (TDC) and a lower pressure peak resulting from combustion occurs a considerable interval after the top dead center. Accordingly, the measured crank angle interval $\theta c$ appears to be closer to the spark timing $\theta A$ and so does not accurately reflect the combustion rate.

An averaging circuit 54 is connected to the interval detector 53 to receive the crank angle interval signal S10. The averaging circuit 54 determines a mean value $\theta c$ of the crank angle intervals $\theta c$ represented by the signal S10. Specifically, this mean value $\theta c$ is normally derived from a weighted mean of the preceding mean value $\theta cb$ and the present crank angle interval $\theta c$. For example, the mean value $\theta c$ maya be given by the following equation:

$$\theta c = (127 \theta cb + \theta c)/128$$

In cases where the present crank angle value $\theta c$ is determined to be erroneous as described hereinafter, the mean value $\theta c$ is given by the following equation:

$$\theta c = \theta cb$$

The averaging circuit 54 generates a signal S11 representing the mean value $\theta cb$.

A comparator 55 is connected to the interval detector 53 and the averaging circuit 54 to receive the signals S10 and S11 representing the crank angle interval $\theta c$ and the mean value $\theta cb$. The comparator 55 determines whether or not the detected peak pressure crank angle $\theta pmax$ is acceptable on the basis of the crank angle interval $\theta c$ and the mean value $\theta cb$. Specifically, the detected peak pressure crank angle $\theta pmax$ is determined to be unacceptable when the crank angle interval $\theta c$ is smaller than the mean value $\theta cb$ by a preset value Ref1 or by more than the preset value Ref1 or when the ratio of the crank angle interval $\theta c$ to the mean value $\theta cb$ is equal to or less than a preset ratio Ref2. Otherwise, the detected peak pressure crank angle $\theta pmax$ is determined to be acceptable. The comparator 55 generates a digital signal S12 which is "0" and "1" when the detected peak pressure crank angle $\theta pmax$ is acceptable and unacceptable respectively.

Acceptably accurate detection of the peak pressure crank angle $\theta pmax$ is generally realized under combustion conditions as illustrated by the broken curve of FIG. 2. Inaccurate detection of the peak pressure crank angle $\theta pmax$ generally occurs under combustion conditions as illustrated by the solid curve of FIG. 2.

The reference angle Ref1 is preferably equal to or greater than 20°. The reference ratio Ref2 is preferably equal to or less than 70%.

A holding circuit 56 is connected to the N-counter 35 and the comparator 55 to receive the signals S3 and S12. When the signal S12 is "0", that is, when the detected peak pressure crank angle $\theta pmax$ is acceptable, the holding circuit 55 passes the signal S3 as it is to the memory 42. When the signal S12 changes from "0" to "1", that is, when the detected peak pressure crank angle $\theta pmax$ becomes unacceptable, the holding circuit 55 latches the signal S3 and thus starts holding the signal to the memory 42 constant. The holding circuit 55 continues to latch the signal S3 until the signal S12 returns to "0". Accordingly, as long as the detected peak pressure crank angle $\theta pmax$ remains unacceptable, this circuit 55 holds the value of the signal S3 which occurred immediately before and at the moment of change of the signal S12 to "1". During the same period, the signal from the holding circuit 56 to the memory 42 is held constant.

When the detected peak pressure crank angle $\theta pmax$ is acceptable, the present corrected crank angle $\theta pmax$-1-4 is stored in the memory 42, since the signal S3 is passed to the memory 42 as it is. When the detected peak pressure crank angle $\theta pmax$ is unacceptable, the present corrected crank angle $\theta pmax$1-4 is not stored in the memory and instead the corrected crank angles $\theta pmax$1-4 derived from the last acceptable peak pressure crank angle $\theta pmax$ continue to be held in the memory 42, since the signal from the holding circuit 56 to the memory 42 remains unchanged independent of the present state of the signal S3.

A counter 57 is connected to the N-counter 35 and the comparator 55 to receive the signals S3 and S12. The counter 57 measures the length of the interval during which the signal S12 from the comparator 55 remains "1", that is, during which the detected peak pressure crank angle $\theta pmax$ remains unacceptable. Specifically, during this interval, a digital signal S13 outputted by the counter 57 represents a number which is incremented by one each time the signal S3 changes from one state to another. When the signal S12 returns to "0", that is, when the detected peak pressure crank angle θpmax returns to an acceptable state, the number represented by the signal S13 is reset to zero. While the signal S12 remains "0", the number represented by the signal S13 remains zero.

A comparator 58 is connected to the counter 57 to receive the signal S13. A generator (not shown) outputs a digital signal S14 representing a preset number Ref3. The reference signal S14 is applied to the comparator 58 through a connection between the generator and the comparator 58. When the number represented by the signal S13 reaches the preset number Ref3, a binary signal S15 outputted by the comparator 58 goes to "1". Accordingly, the signal S15 indicates that the detected peak pressure crank angle θpmax has been continuously unacceptable for longer than a preset crank angle interval defined by the preset number Ref3.

The preset number Ref3 is preferably 12, which corresponds to an interval during which the engine crankshaft rotates six times.

It should be noted that the interval between the spark timing and the peak pressure moment may be detected in units of normal time rather than in terms of crank angle.

DESCRIPTION OF THE SECOND PREFERRED EMBODIMENT

Figure 3:
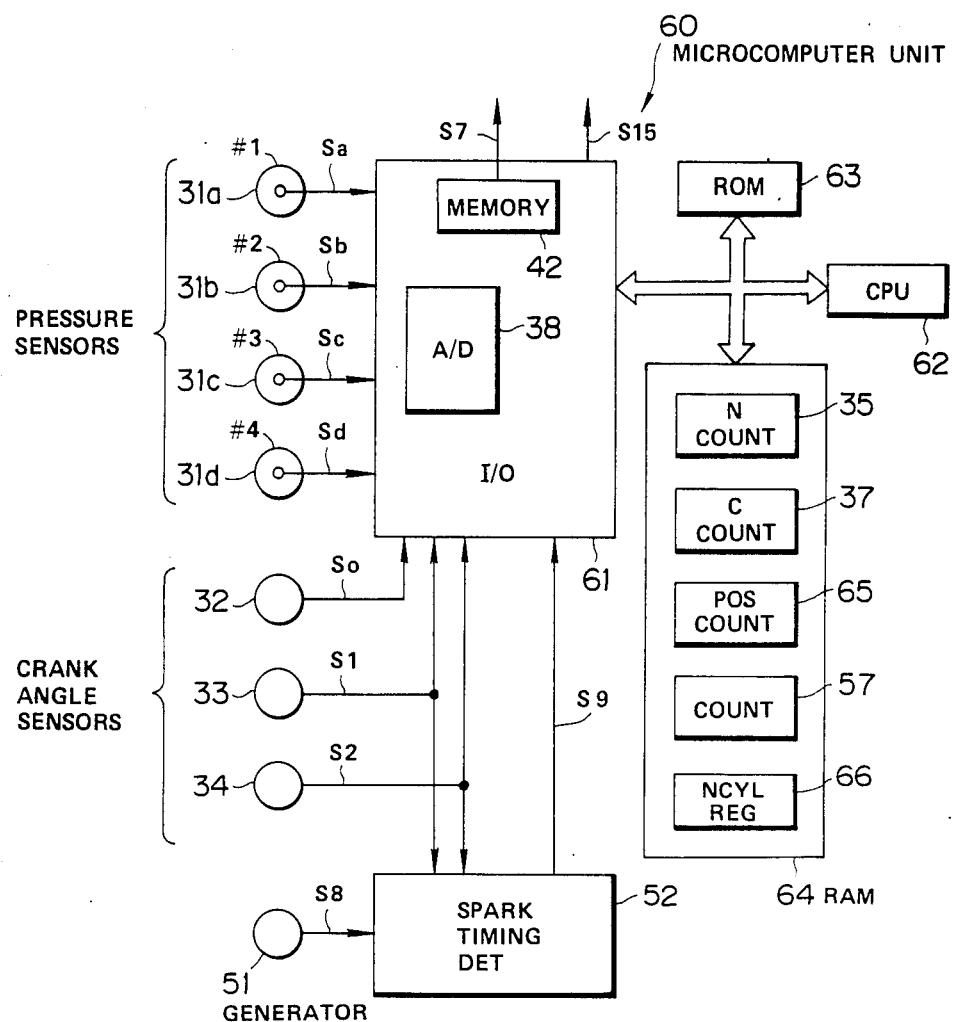
FIG. 3 is a block diagram of an engine combustion condition detecting system according to a second embodiment of this invention.

With reference to FIG. 3, a microcomputer unit 60 includes the combination of an input/output (I/O) circuit 61, a central processing unit (CPU) 62, a read-only memory (ROM) 63, and a random-access memory (RAM) 64.

The I/O circuit 61 is connected to the pressure sensors 31a-31d, the crank angle sensors 32-34, and the spark-timing detector 52 to receive the pressure signals Sa-Sd, the crank angle signals S0-S2, and the spark-timing signal S9. The I/O circuit 61 includes the A/D converter 36 for deriving digital pressure signals from the analog pressure signals Sa-Sd. Also, the I/O circuit 61 includes the memory 42 for storing the peak pressure crank angles θpmax1, θpmax2, θpmax3, and θpmax4.

The RAM 64 includes the N-counter 35, the C-counter 37, the counter 57, a POS-counter 65, and a NCYL-register 66.

Figure 4:
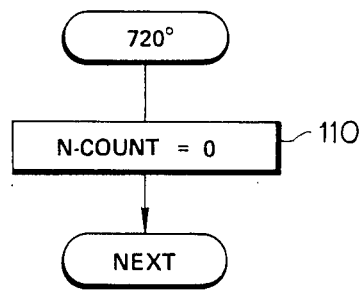
FIG. 4 is a flowchart of a first segment of a program for operating the control unit of FIG. 3.
Figure 5:
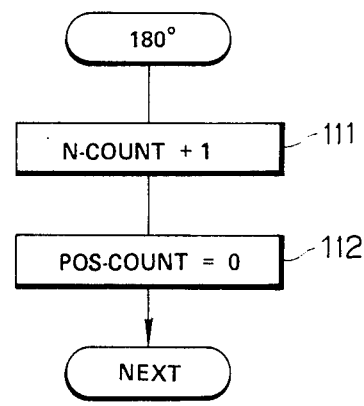
FIG. 5 is a flowchart of a second segment of the program for operating the control unit of FIG. 3.
Figure 6:
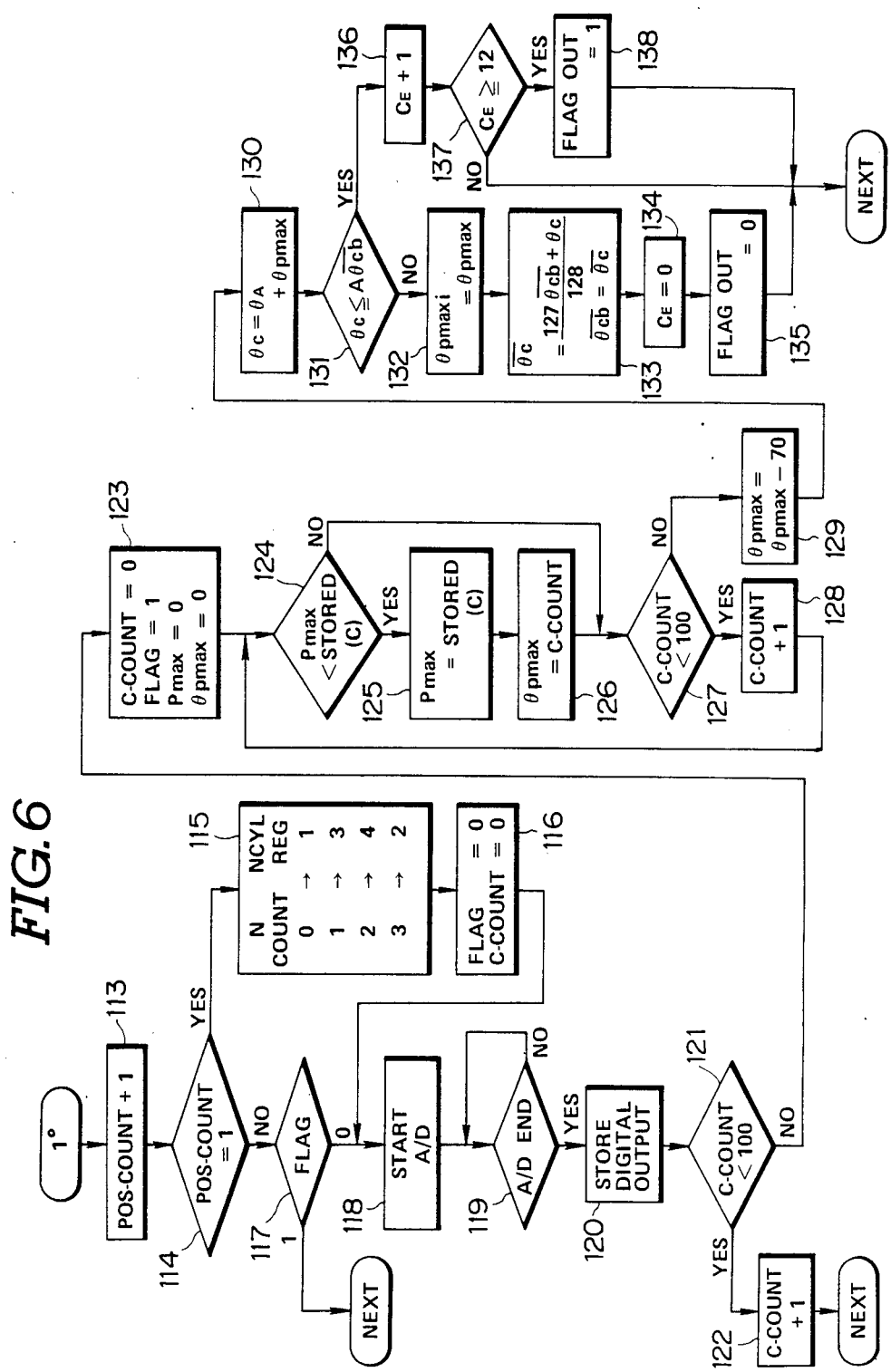
FIG. 6 is a flowchart of a third segment of the program for operating the control unit of FIG. 3.

The microcomputer unit 60 operates in accordance with a program held in the ROM 63. FIGS. 4-6 are flowcharts of segments of this program. The first segment of the program shown in FIG. 4 is executed upon receipt of each 720° pulse S0. The second segment of the program shown in FIG. 5 is executed upon receipt of each 180° pulse S1. The third segment of the program shown in FIG. 6 is executed upon receipt of both edges of each pulse S2. In other words, the first, second, and third segments of the program are executed synchronously with the crank angle signals S0, S1, and S3 respectively.

Figure 7:
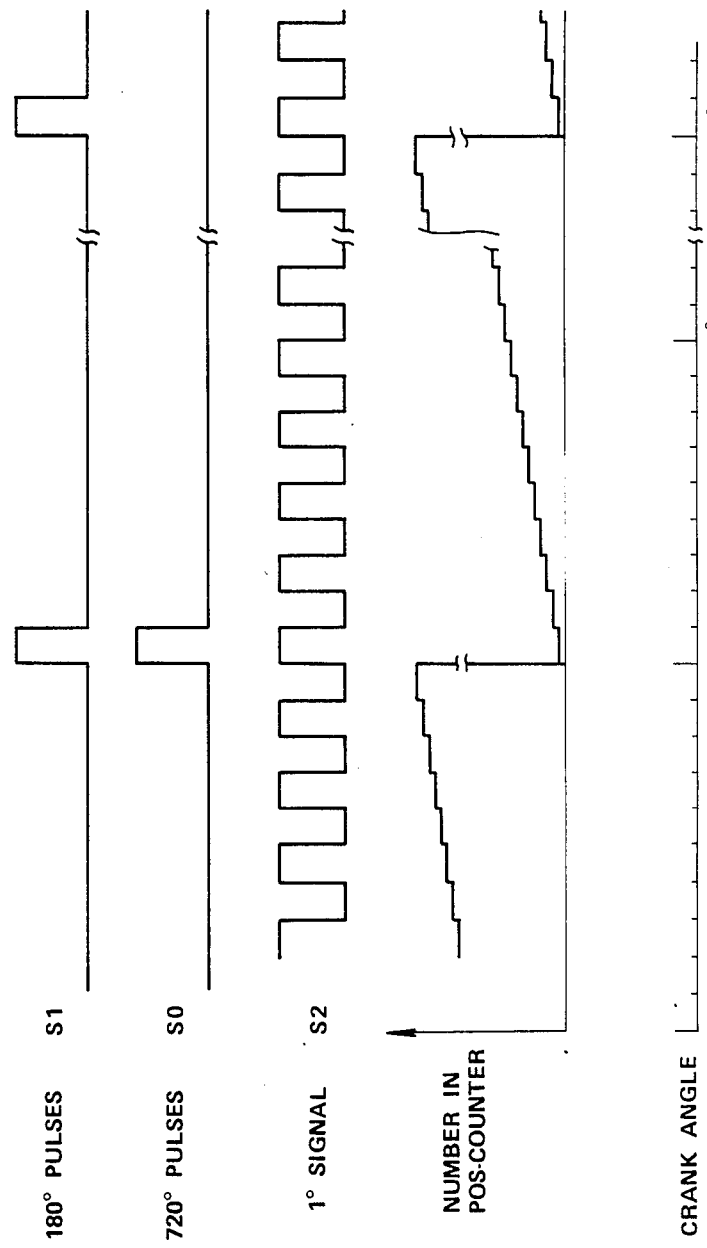
FIG. 7 is a diagram of the reference pulse signals S0, S1, and S3, and the number represented by the POS-counter with respect to crank angle in the embodiment of FIG. 3.

As shown in FIG. 7, the rising edge of each 720° pulse S0 occurs at a crank angle which precedes the top dead center (TDC) of the compression stroke of the first engine cylinder #1 by 70°.

The segment of the program shown in FIG. 4 starts in response to the rising edge of each 720° pulse S0. As shown in FIG. 4, the program advances to a step 110 in which the number represented by the N-counter 35 is initialized or cleared to "0". After the step 110 is completed, this segment of the program ends and then waits for the next execution cycle.

As shown in FIG. 7, the reference pulses S1 are spaced at equal crank angle intervals, 180° in the case of a four-cylinder engine. The rising edge of each 180° pulse S1 precedes the top dead center of the compression stroke of a corresponding engine cylinder by 70°.

The segment of the program shown in FIG. 5 starts in response to the rising edge of each 180° pulse S1. As shown in FIG. 5, the program advances first to a step 111 in which the number represented by the N-counter 35 is incremented by one.

In a step 112 following the step 111, the number represented by the POS-counter 65 is initialized or cleared to "0". After the step 112 is completed, this segment of the program ends and then waits for the next execution cycle.

As shown in FIG. 7, the rising and falling edges of the reference pulses S2 are spaced at equal crank angle intervals of 1°.

The segment of the program shown in FIG. 6 starts in response to either of the rising and falling edges of each reference pulse S2.

In cases where the microcomputer unit 60 receives the rising edges of the reference pulses S0, S1, and S2 at the same moment, the segment of the program shown in FIG. 4 is executed first and then the segment of the program shown in FIG. 5 is executed prior to execution of the segment of the program shown in FIG. 6. In cases where the microcomputer unit 60 receives the rising edges of the reference pulses S1 and S2 at the same moment, the segment of the program shown in FIG. 5 is executed prior to execution of the segment of the program shown in FIG. 6.

As shown in FIG. 6, the program advances first to a step 113 in which the number represented by the POS-counter 65 is incremented by one. Accordingly, the number represented by the POS-counter 65 is incremented by one for each rotation of the engine crankshaft through 1° as shown in FIG. 7.

In a step 114 following the step 113, the number represented by the POS-counter 65 is checked to see if it equals one. If this number equals one, the program advances to a step 115. If this number is not equal to one, the program advances to a step 117.

In the step 115, the next engine cylinder to reach top dead center of its compression stroke is identified on the basis of the number represented by the N-counter 35. Since the engine cylinders are represented by the numbers, e.g., 1-4 in the case of a four-cylinder engine, the number representing the engine cylinder which will next reach the top dead center is stored in the NCYL-register 66. In the case of a four-cylinder engine, when the numbers represented by the N-counter 35 are "0" and "1", "1" and "3" are stored in the NCYL-register 66 respectively. When the numbers represented by the N-counter 35 are "2" and "3", "4" and "2" are stored in the NCYL-register 66 respectively.

In a step 116 following the step 115, a variable FLAG is reset to "0". As will be made clear hereinafter, the FLAG is used to determine whether or not analog-to-digital (A/D) conversion is to be performed. If the FLAG is "0", A/D conversion is to be performed. If the FLAG is "1", A/D conversion is not to be performed. In addition, the C-counter 37 is cleared to "0". As will be made clear hereinafter, the C-counter 37 indicates the number of times A/D conversion has been performed and also the crank angle interval since the rising edge of the last reference pulse S1. After the step 116, the program advances to a step 118.

In the step 117, the value FLAG is checked to see if it is "0" or "1". If the FLAG is "0", that is, if A/D conversion is to be performed, the program advances to the step 118. If the FLAG is "1", that is, if A/D conversion is not to be performed, the segment of the program of FIG. 6 ends and then waits for the next execution cycle.

In the step 118, one of the analog pressure signals Sa–Sd is selected and passed to the A/D converter 38 in accordance with the number represented by the NCYL-register 66. It should be noted that the number in the NCYL-register 66 represents the engine cylinder which will next reach the top dead center of its compression stroke. Specifically, when the numbers represented by the NCYL-register 66 are "1", "2", "", and "4", the pressure signals Sa, Sb, Sc, and Sd are selected respectively. Then A/D conversion starts.

In a step 119 following the step 118, the A/D conversion is checked for completion. If the A/D conversion is not yet complete, the program returns to the step 119. After the A/D conversion is completed, the program advances to a step 120.

In the step 120, the digital output from the A/D converter 38 representing the pressure is stored in a register having an address which corresponds to the value represented by the C-counter 37. This resister resides within the RAM 64.

In a step 121 following the step 120, the value represented by the C-counter 37 is checked to see if it is smaller than a preset value Ref4, e.g., 100. In cases where the reference pulses S1 precede the top dead centers of the compression strokes by 70°, the preset value Ref4 equal to 100 corresponds to a crank angle 30° after the top dead centers. If the value of the C-counter 37 is less than the reference value Ref4, the program advances to a step 122. If the value of the C-counter 37 is equal to or greater than the reference value Ref4, the program advances to a step 123.

In the step 122, the number represented by the C-counter 37 is incremented by one. After the step 122, the segment of the program of FIG. 6 ends and then waits for the next execution cycle.

In cases where the reference pulses S1 precede the top dead centers of the compression strokes by 70° and the preset value Ref4 is 100, the number represented by the C-counter 37 continues to be periodically incremented by one until the crank angle reaches 30° after the top dead centers as a result of cooperation between the steps 121 and 122.

In this way, while the number in the C-counter 37 increases from 0 to 100 for example, the analog pressure signal is sampled and converted to a corresponding digital signal periodically at crank angles spaced at 1° intervals. These digital pressure values are stored sequentially in the registers respectively. The addresses of the registers represent the crank angles at which the associated stored pressure values are sampled.

In the step 123, the number represented by the C-counter 37 is cleared to "0" and the variable FLAG is set to "1". Furthermore, variables Pmax and $\theta$pmax are both reset to "0".

In a step 124 following the step 123, the value Pmax is compared to the pressure value stored in the register having the address which corresponds to the number represented by the C-counter. If the value Pmax is equal to or greater than the pressure value stored in the register, the program advances to a step 127. If the value Pmax is less than the stored pressure value, the program advances to a step 125.

In the step 125, the variable Pmax is set equal to the value stored in the register having the address which corresponds to the value in the C-counter 37.

In a step 126 following the step 125, the variable $\theta$pmax is set equal to the value represented by the C-counter 37. After the step 126, the program advances to the step 127.

In the step 127, the value represented by the C-counter 37 is checked to see if it is less than a preset value Ref5, e.g., 100 equal to the reference value Ref4. If the value in the C-counter 37 is less than the preset value Ref5, the program returns to the step 124 by way of a step 128 in which the number in the C-counter 37 is incremented by one. If the value in the C-counter 37 is not less than the preset value Ref5, the program advances to a step 129. Accordingly, the combination of the steps 124–128 reiterates until the value in the C-counter 37 reaches the preset value Ref5. Once the value in the C-counter 37 reaches the preset value Ref5, the program advances to the step 129.

As a result of the combination of the steps 124–128, the maximum of the pressure value held in the registers is determined and the variable $\theta$pmax finally represents the crank angle at which this maximum pressure value occurs.

In the step 129, the variable $\theta$pmax is set equal to the preceding $\theta$pmax minus 70, which corresponds to the crank angle interval between the rising edge of the reference pulse S1 and the top dead center. In other words, "$\theta pmax = \theta pmax - 70$" is executed.

In a step 130 following the step 129, the spark timing is derived from the signal S9. In the program, a variable $\theta$A represents the spark timing. Then, the crank angle interval from the spark timing $\theta$A to the peak pressure crank angle $\theta$pmax is measured. In the program, a variable $\theta$c represents this crank angle interval. In other words, "$\theta c = \theta A + \theta pmax$" is executed.

In a step 131 following the step 130, the value $\theta$c is compared to the mean value $\theta$cb multiplied by a preset factor or constant A. If the value $\theta$c is greater than the value A$\theta$cb, the program advances to a step 132. If the value $\theta$c is equal to or less than the value A$\theta$cb, the program advances to a step 136.

In the case where the program advances from the step 131 to the step 132, the detected peak pressure crank angle has been determined to be acceptable. In the case where the program advances from the step 131 to the step 136, the detected peak pressure crank angle has been determined to be unacceptalbe.

In the step 132, the present peak pressure crank angle $\theta$pmax is stored in a cell $\theta$pmaxi of the memory 42, where i is a variable integer from 1 to 4 which corresponds to the value in the NCYL-register 66 and thus which represents the engine cylinder now exposed to measurement. Accordingly, the memory cells $\theta$pmax1, $\theta$pmax2, $\theta$pmax3, and $\theta$pmax4 hold the peak pressure crank angles for the engine cylinder #1, #2, #3, and #4 respectively.

In a step 133 following the step 132, a mean value $\theta$c of the crank angle intervals $\theta$c is calculated. Specifically, "$\theta c = (127 \theta cb + \theta c)/128$" is executed. The calculated value $\theta$c is stored in a register allocated for the variable $\theta$cb. In other words, "$\theta cb = \theta c$" is executed.

In a step 134 following the step 133, the value represented by the counter 57 is cleared to "0". In the program, the variable CE represents the value in the counter 57.

In a step 135 following the step 134, the variable FLAG OUT is reset to "0". After the step 135, the segment of the program of FIG. 6 ends and then waits for the next execution cycle.

In the step 136, the value CE represented by the counter 57 is incremented by one.

In a step 137 following the step 136, the value CE is compared to a preset value Ref6, e.g., 12. If the value CE is less than the preset value Ref6, the segment of the program of FIG. 6 ends and then waits for the next execution cycle. If the value CE is equal to or greater than the preset value Ref6, the program advances to a step 138.

In the step 138, the variable FLAG OUT is set to "1". After the step 138, the segment of the program of FIG. 6 ends and then waits for the next execution cycle.

The signal S15 from the I/O circuit 61 reflects the value FLAG OUT. When the value FLAG OUT is "1", the signal S15 indicates that the peak pressure detection has been continuously unacceptably inaccurate for longer than a preset interval of crank angle defined by the reference value Ref6. In the case where the reference value Ref6 is 12, this crank angle interval corresponds three full rotations of the engine crankshaft.

As described previously, when the detected peak pressure is determined to be unacceptable, the program advances from the step 131 to the step 136. In this case, no actions are performed on the memory 42 so that the peak pressure crank angles remain at their preceding updated values. Furthermore, the step 138 enables the output signal S15 to indicate that the detected peak pressure crank angle has been unacceptable for longer than the preset crank angle interval.

DESCRIPTION OF THE THIRD PREFERRED EMBODIMENT

Figure 8:
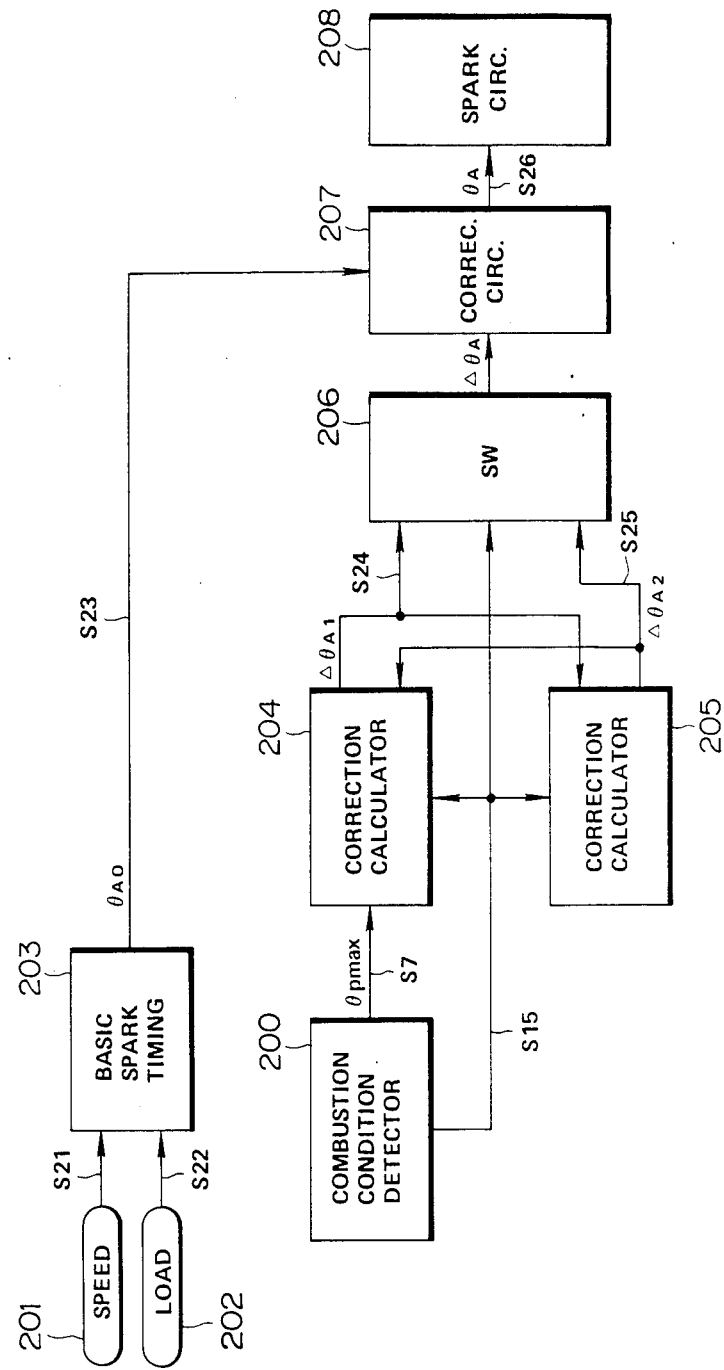
FIG. 8 is a block diagram of a spark timing control system according to a third embodiment of this invention.

With reference to FIG. 8, a spark timing control system includes the combustion condition detector of FIGS. 1 or 3 which is denoted by the reference numeral 200.

An engine speed sensor 201 generates a signal S21 representing the rotational speed of the engine.

An engine load sensor 202 generates a signal S22 representing the load on the engine.

A basic spark timing calculator 203 is connected to the sensors 201 and 202 to receive the signals S21 and S22. The calculator 203 derives a basic spark timing $\theta A0$ from the engine speed and load values represented by the signals S21 and S22. An output signal S23 from the calculator 203 represents the derived basic spark timing $\theta A0$.

A first correction calculator 204 is connected to the combustion condition detector 200 to receive the signal S7 representing the peak pressure crank angles $\theta$pmax-1-4. Each time the engine crankshaft rotates through 180°, the calculator 204 determines a correction factor $\Delta\theta A1$ for spark timing. It should be noted that the reference pulses S1 may be used to trigger this periodic determination of the correction factor $\Delta\theta A1$. An output signal S24 from the calculator 204 represents the determined correction factor $\Delta\theta A1$.

Specifically, the calculator 204 first determines whether or not the peak pressure crank angle $\theta$pmax follows a preset target timing Ref7. If the peak pressure crank angle $\theta$pmax trails the target timing Ref7, the calculator 204 sets the correction factor $\Delta\theta A1$ to a value that will advance the actual spark timing. If the peak pressure crank angle $\theta$pmax leads the target timing Ref7, the calculator 204 sets the correction factor $\Delta\theta A1$ to a value that will retard the actual spark timing. This operation tends to hold the peak pressure crank angle $\theta$pmax at essentially the target timing Ref7, since the peak pressure crank angle $\theta$pmax depends on the actual spark timing. It should be noted that the target timing Ref7 trails the top dead center of the compression stroke by a preset crank angle interval in the range of 10°-20°.

In more detail, when the peak pressure crank angle $\theta$pmax follows the target timing Ref7, the calculator 204 determines the correction factor $\Delta\theta A1$ by referring to the following equation:

$$\Delta\theta A1 = \Delta\theta A(\text{preceding}) + a$$

where $\Delta\theta A$ will be made clear hereinafter and a is a preset constant inducing advance of the actual spark timing. When the peak pressure crank angle $\theta$pmax precedes the target timing Ref7, the calculator 204 determines the correction factor $\Delta\theta A1$ by referring to the following equation:

$$\Delta\theta A1 = \Delta\theta A(\text{preceding}) - a$$

where $-a$ induces retardation of the actual spark timing.

A second correction calculator 205 is connected to the combustion condition detector 200 to receive the signal S15 indicating whether or not the detected peak pressure crank angle is acceptable. In cases where the detected peak pressure crank angle is unacceptable, each time the engine crankshaft rotates through 180°, the calculator 205 derives a correction factor $\Delta\theta A2$ for spark timing by referring to the following equation:

$$\Delta\theta A2 = \Delta\theta A(\text{preceding}) + b$$

where b is a preset constant inducing advance of the actual spark timing. It should be noted that unacceptable peak pressure crank angles generally result from excessive retardation of the spark timing. The constant b is preferably in the range of 1°-10° in terms of crank angle. It should be noted that the reference pulses S1 may be used to trigger this periodic determination of the correction factor $\Delta\theta A2$. An output signal S25 from the calculator 205 represents the derived correction factor $\Delta\theta A2$.

When the signal S15 changes to indicate that the detected peak pressure crank angle is unacceptable, the second calculator 205 starts to derive the correction factor $\Delta\theta A2$ from the final correction factor $\Delta\theta A1$. In other words, the final correction factor $\Delta\theta A1$ is used as an initial value for the first determination of the other correction factor $\Delta\theta A2$. When the signal S15 changes to indicate that the detected peak pressure crank angle is acceptable, the first calculator 204 starts to derive the correction factor $\Delta\theta A1$ from the final correction factor $\Delta\theta A2$. In other words, the final correction factor $\Delta\theta A2$ is used as an initial value for the first determination of the other correction factor $\Delta\theta A1$. It should be noted that the calculators 204 and 205 are connected to swap the signals S24 and S25 which represent the correction factors ΔθA1 and ΔθA2.

A switch 206 is connected to the combustion condition detector 200 to receive the signal S15 indicating the acceptability of the detected peak pressure crank angle. Also, the switch 206 is connected to the calculators 204 and 205 to receive the signals S24 and S25 representing the spark timing correction factors ΔθA1 and ΔθA2. When the detected peak pressure crank angle is acceptable, the switch 206 selects and passes the signal S24 representing the first correction factor ΔθA1. When the detected peak pressure crank angle is unacceptable, the switch 206 selects and passes the signal S25 representing the second correction factor ΔθA2. The reference character ΔθA denotes the correction factor represented by the signal selected and passed by the switch 206. This correction factor ΔθA is used by the correction calculators 204 and 205 in deriving the next correction factors ΔθA1 and ΔθA2. The reference character ΔθA(preceding) represents this correction factor.

A correction circuit 207 is connected to the calculator 203 to receive the signal S23 representing the basic spark timing θA0. The correction circuit 207 is also connected to the switch 206 to receive the selected signal representing the correction factor ΔθA. The correction circuit 207 derives a final desired spark timing θA from the values θA0 and ΔθA by referring to the following equation:

$$\theta A = \theta A0 + \Delta\theta A$$

An output signal S26 from the correction circuit 207 represents the final desired spark timing θA.

A conventional spark circuit 208 is connected to the correction circuit 207 to receive the signal S26 representing the final desired spark timing θA. The spark circuit 208 generates a spark control signal designed to generate a spark at a moment coincident with the final desired spark timing θA.

DESCRIPTION OF THE FOURTH PREFERRED EMBODIMENT

Figure 9:
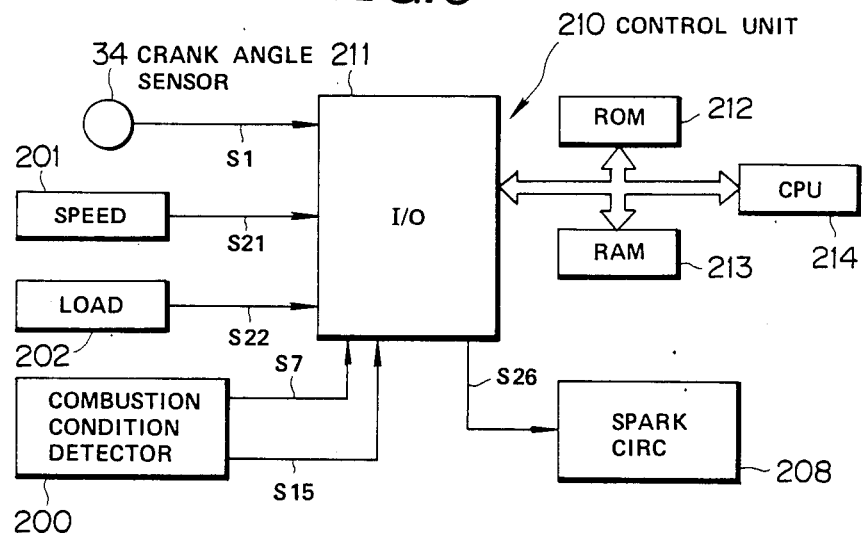
FIG. 9 is a block diagram of a spark timing control system according to a fourth embodiment of this invention.

With reference to FIG. 9, a spark timing control system includes the combustion condition detector 200 of FIGS. 1 or 3.

A control unit 210 includes the combination of an input/output (I/O) circuit 211, a read-only memory (ROM) 212, random-access memory (RAM) 213, and a central processing unit (CPU) 214.

The I/O circuit 211 is connected to the sensors 201 and 202 to receive the engine speed signal S21 and the engine load signal S22. The I/O circuit 211 is also connected to the combustion condition detector 200 to receive the signal S7 representing the peak pressure crank angle θpmax and the signal S15 indicating that the detected peak pressure crank angle is unaccepable. The signal S26 representing the final desired spark timing θA is outputted from the I/O circuit 211 to the spark circuit 208 through a connection between the circuits 211 and 208.

The control unit 210 operates in accordance with a program held in the ROM 212. The program is executed periodically in synchronism with the reference pulses S1 from the crank angle sensor 33, which are conducted to the I/O circuit 211 through a connection between these elements 33 and 211. Accordingly, the program is executed each time the engine crankshaft rotates through 180° in the case of a four-cylinder engine.

Figure 10:
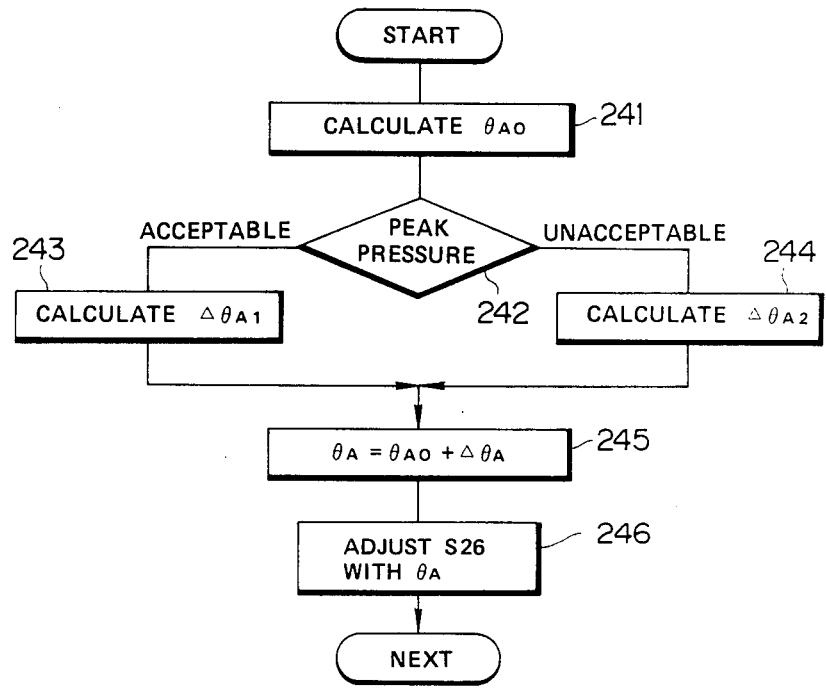
FIG. 10 is a flowchart of a program for operating the control unit of FIG. 9.

FIG. 10 is a flowchart of the program. As shown in FIG. 10, in a first step 241 of the program, a basic spark timing value θA is derived from the engine speed and engine load values by formula or by referring to a memory table held in the ROM 212. The basic spark timing θA is given as an advance crank angle, that is, a crank angle interval between the top dead center of the compression stroke and a point preceding the top dead center.

Figure 11:
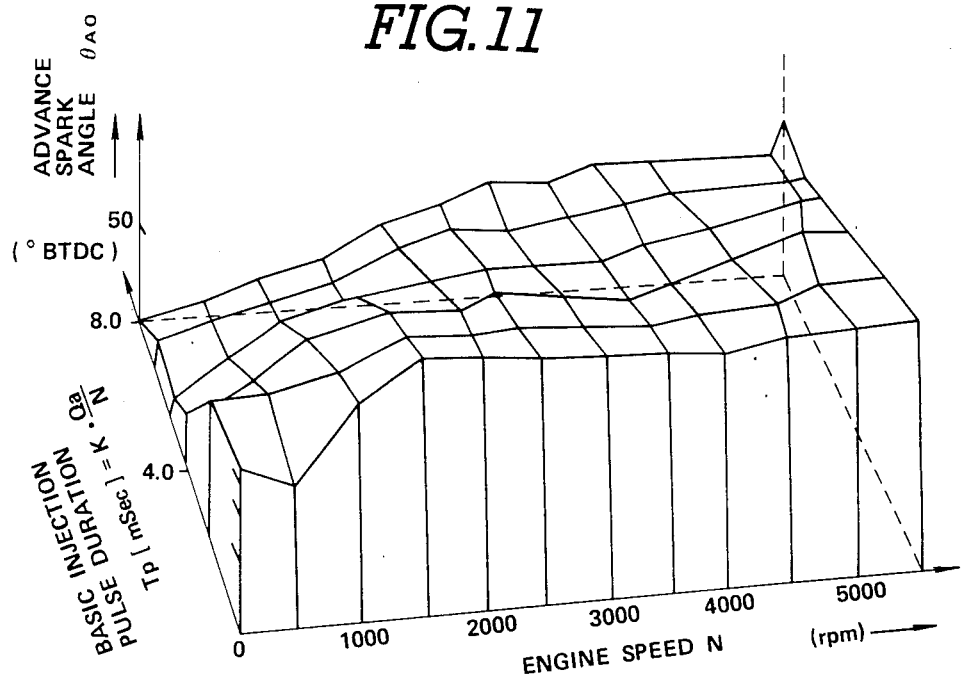
FIG. 11 is a diagram of a memory table in which a set of spark advance angles are plotted as a function of engine speed and basic fuel injection pulse duration.

FIG. 11 shows an example of the memory table used in the step 241. In this table, a set of basic spark timing values are plotted as a function of engine speed and basic fuel injection pulse duration. In cases where the step 241 uses the memory table of FIG. 11, the engine load signal S22 includes a fuel injection pulse signal from which the duration of each fuel injection pulse is derived as an indication of the engine load.

Returning to FIG. 10, in a step 242 following the step 241, a determination is made as to whether or not the signal S15 indicates that the detected peak pressure crank angle is acceptable. When the signal S15 indicates an acceptable state, the program advances to a step 243. When the signal S15 indicates an unacceptable state, the program advances to a step 244.

In the step 243, a correction factor ΔθA1 is calculated as in the embodiment of FIG. 8. Accordingly, the correction factor ΔθA1 depends on the peak pressure crank angle θpmax. After the step 243, the program advances to a step 245.

In the step 244, a correction factor ΔθA2 is calculated as in the embodiment of FIG. 8. After the step 244, the program advances to the step 245.

In the step 245, a final desired spark timing θA is calculated from the values θA0 and ΔθA as in the embodiment of FIG. 8. It should be noted that the variable ΔθA represents the correction factor ΔθA1 or ΔθA2 given in the preceding step 243 or 244.

In a step 246 following the step 245, the signal S26 to the spark circuit 208 is adjusted to represent the final desired spark timing θA given in the preceding step 245. After the step 246, the program ends and waits for the next execution cycle.

DESCRIPTION OF THE FIFTH PREFERRED EMBODIMENT

Figure 12:
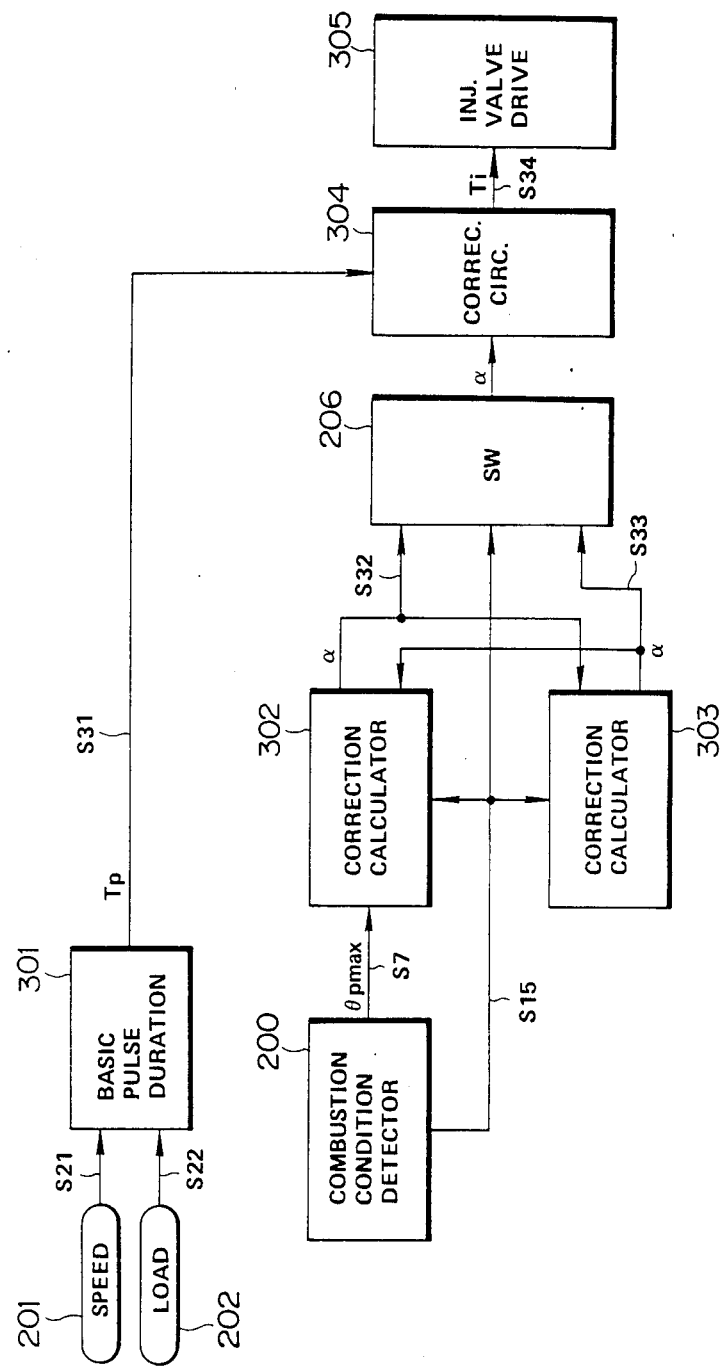
FIG. 12 is a block diagram of a fuel injection quantity control system according to a fifth embodiment of this invention.

With reference to FIG. 12, an air-to-fuel ratio control system includes the combustion condition detector 200 of FIGS. 1 or 3.

A basic fuel injection quantity calculator 301 is connected to the sensors 201 and 202 to receive the signals S21 and S22 representing the engine speed and the engine load. In this embodiment, the engine load sensor 202 includes an air flow meter generating a signal representing the rate of air flow into the engine. The calculator 301 derives a basic fuel injection pulse duration Tp from the engine speed N and the air flow rate Qa by referring to the following equation:

$$Tp = KQa/N$$

where K is a preset constant. It should be noted that the fuel injection quantity is proportional to the fuel injection pulse duration. An output signal S31 from the calculator 301 represents the derived basic pulse duration Tp.

A first correction calculator 302 is connected to the combustion condition detector 200 to receive the signal S7 representing the peak pressure crank angle $\theta$pmax. The calculator 302 determines a correction factor $\alpha$ for the air-to-fuel ratio on the basis of the peak pressure crank angle $\theta$pmax. An output signal S32 from the calculator 302 represents the derived correction factor $\alpha$.

Specifically, the calculator 302 includes counters u1, u2, u3, and u4 corresponding to the engine cylinders #1, #2, #3, and #4 respectively. When the peak pressure crank angle $\theta$pmax lies outside a preset range bounded by upper and lower limits, the integer represented by the corresponding counter is incremented by one. In the case where the integer represented by at least one of the counters reaches a preset value, e.g., 3, within a preset crank angle interval, e.g., 24 rotations of the engine crankshaft or in the case where the number of the counters which represent the intergers equal to or greater than 1 reaches a preset value, e.g., 2, the stability of engine operation is determined to be unacceptable and the correction factor $\alpha$ is given by the following equation to make the air-fuel mixture richer:

$$\alpha = \alpha + \Delta\alpha R$$

where $\Delta\alpha R$ is a preset constant. The initial value of $\alpha$ is 1. In the other case, the stability of engine operation is determined to be acceptable and the correction factor $\alpha$ is given by the following equation to make the air-fuel mixture leaner:

$$\alpha = \alpha - \Delta\alpha L$$

where $\Delta\alpha L$ is a preset constant.

A second correction calculator 303 is connected to the combustion condition detector 200 to receive the signal S15 indicating whether or not the detected peak pressure crank angle is acceptable. Each time the engine crankshaft rotates through 180°, the calculator 303 derives a new correction factor $\alpha$ for the air-to-fuel ratio on the basis of whether or not the detected peak pressure crank angle is acceptable. It should be noted that the reference pulses S1 may be used to trigger this periodic derivation of the correction factor $\alpha$. An output signal S33 from the calculator 303 represents the derived correction factor $\alpha$.

In the case where the signal S15 changes from "0" to "1", that is, in the case where the signal S15 changes to indicate that the detected peak pressure crank angle is unacceptable, the calculator 303 first initializes the correction factor $\alpha$ to a value equal to the final correction factor $\alpha$ given by the calculator 302. It should be noted that the calculator 303 is connected to the calculator 302 to receive the signal S32 representing the correction factor $\alpha$ derived by the calculator 302. If this initial value is greater than 1.0, the calculator 303 then derives the correction factor $\alpha$ by referring to the equation below each time the engine crankshaft rotates through 180°:

$$\alpha = \alpha(\text{preceding}) - c$$

where c is a preset positive constant. This periodic derivation of the correction factor $\alpha$ continues until the signal S15 returns from "1" to "0", that is, unitl the signal S15 changes to indicate that the detected peak pressure crank angle is acceptable. If the initial value is not greater than 1.0, the calculator 302 then derives the correction factor $\alpha$ by referring to the following equation each time the engine crankshaft rotates through 180°:

$$\alpha = \alpha(\text{preceding}) + d$$

where d is a preset positive constant. This periodic derivation of the correction factor $\alpha$ continues until the signal S15 returns from "1" to "0", that is, until the signal S15 changes to indicate that the detected peak pressure crank angle is acceptable.

In the case where the signal S15 changes from "1" to "0", that is, in the case where the signal S15 changes to indicate that the detected peak pressure crank angle is acceptable, the final correction factor $\alpha$ derived by the calculator 303 is used by the other calculator 302 as an initial value in deriving the correction factor $\alpha$. It should be noted that the calculator 302 is connected to the calculator 303 to receive the signal S33 representing the correction factor $\alpha$.

The switch 206 is connected to the combustion condition detector 200 to receive the signal S15 indicating whether or not the detected peak pressure crank angle is acceptable. The switch 206 is also connected to the calculators 302 and 303 to receive the signals S32 and S33 representing the correction factors $\alpha$. When the signal S15 is "0", that is, when the detected peak pressure crank angle is acceptable, the switch 206 selects and passes only the signal S32 from the first calculator 302. When the signal S15 is "1", that is, when the detected peak pressure crank angle is unacceptable, the switch 206 selects and passes only the signal S33 from the second calculator 303.

A correction circuit 304 is connected to the calculator 301 to receive the signal S31 representing the basic injection pulse duration Tp. The correction circuit 304 is also connected to the switch 206 to receive the signal transmitted by the swith 206 which represents the correction factor $\alpha$. The correction circuit 304 derives a final desired injection pulse duration Ti from the basic duration Tp, the correction factor $\alpha$, and a power source or battery voltage by referring to the following equation:

$$Ti = \alpha Tp + Ts$$

where Ts represents a value related to the power source voltage. Consideration of the power source voltage in deriving the injection pulse duration Ti compensates for variations of the operating characteristics of fuel injection valves with the power source voltage. An output signal S34 from the correction circuit 304 represents the derived final desired duration Ti.

A fuel-injection valve drive circuit 305 is connected to the correction circuit 304 to receive the signal S34 representing the final desired pulse duration Ti. Each time the engine crankshaft rotates through one full turn, the drive circuit 305 opens each of the fuel injection valves for an interval equal to the final desired duration Ti. It should be noted that the reference pulses S1 may be used for this periodical drive of the fuel injection valves.

DESCRIPTION OF THE SIXTH PREFERRED EMBODIMENT

Figure 13:
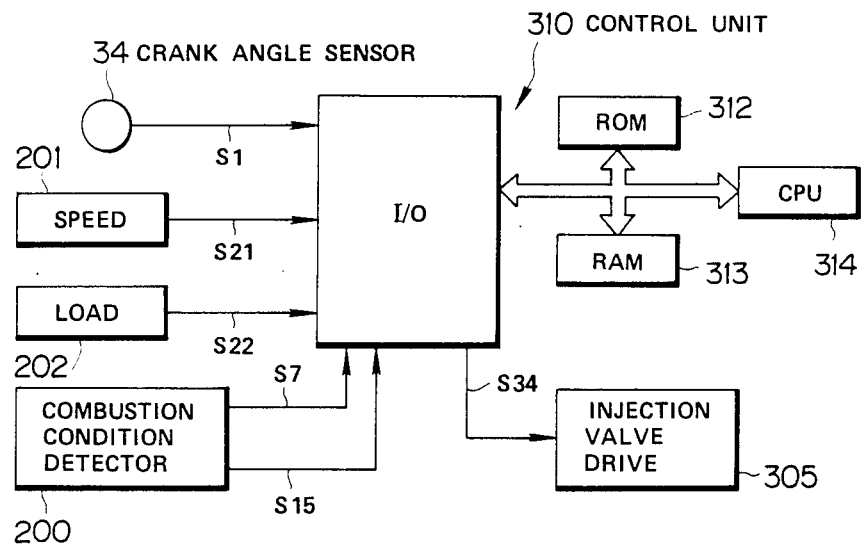
FIG. 13 is a block diagram of a fuel injection quantity control system according to a sixth embodiment of this invention.

With reference to FIG. 13, a fuel injection quantity control system includes the combustion condition detector 200 of FIGS. 1 or 3.

A control unit 310 includes the combination of an input/output (I/O) circuit 311, a read-only memory (ROM) 312, a random-access memory (RAM) 313, and a central processing unit (CPU) 314.

The I/O circuit 311 is connected to the sensors 33, 201, and 202 to receive the reference pulse signal S1, the engine speed signal S21, and the engine load signal S22. The I/O circuit 311 is also connected to the combustion condition detector 200 to receive the signal S7 representing the peak pressure crank angles $\theta$pmax and the signal S15 indicating whether or not the detected peak pressure crank angle is acceptable. The fuel injection control signal S34 is outputted from the I/O circuit 311 to the fuel-injection valve drive circuit 305 through a connection between the circuits 311 and 305.

The control unit 310 operates in accordance with a program held in the ROM 312. The program is executed in synchronism with the reference pulses S1. Accordingly, in the case of a four-cylinder engine, the program is executed each time the engine crankshaft rotates through 180°.

Figure 14:
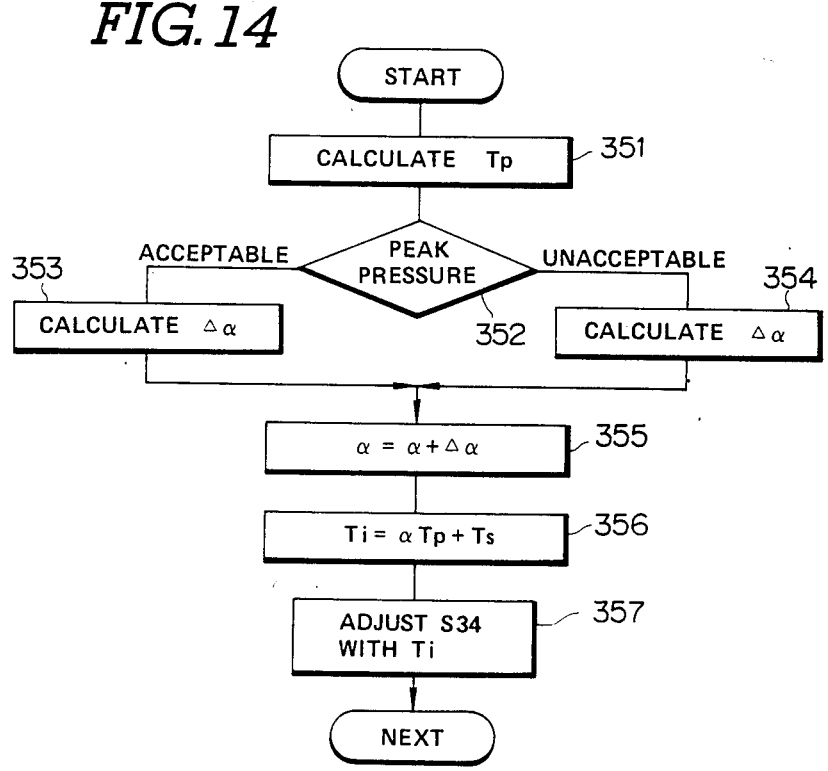
FIG. 14 is a flowchart of a program for operting the control unit of FIG. 13.

FIG. 14 is a flowchart of the program. As shown in FIG. 14, in a first step 351 of the program, a basic fuel injection pulse duration Tp is derived from the engine speed and the engine load as in the embodiment of FIG. 12.

In a step 352 following the step 351, the state of the signal S15 is checked to determine whether or not the detected peak pressure crank angle is acceptable. If the detected peak pressure crank angle is acceptable, the program advances to a step 353. If the detected peak pressure crank angle is unacceptable, the program advances to a step 354.

In the step 353, a value $\Delta\alpha$ is derived on the basis of the peak pressure crank angle $\theta$pmax. Specifically, the stability of engine operation is first determined on the basis of the peak pressure crank angle $\theta$pmax as in the embodiment of FIG. 12. If the engine stability is acceptable, the value $\Delta\alpha$ is set to the value $-\Delta\alpha L$. If the engine stability is unacceptable, the value $\Delta\alpha$ is set to the value $+\Delta\alpha R$. These functions are similar to those of the calculator 302 in the embodiment of FIG. 12. After the step 353, the program advances to a step 355.

In the step 354, the value $\Delta\alpha$ is derived as described in more detail hereinafter. The step 354 corresponds to part of the functions of the calculator 303 in the embodiment of FIG. 12. After the step 354, the program advances to a step 355.

In the step 355, the new correction factor $\alpha$ is derived from the preceding correction factor $\alpha$ and the value $\Delta\alpha$ given in the step 353 or 354 by referring to the following equation:

$$\alpha = \alpha(\text{preceding}) + \Delta\alpha$$

In a step 356 subsequent to the step 355, the final desired injection pulse duration Ti is derived from the basic duration Tp, the correction factor $\alpha$, and the value Ts as in the embodiment of FIG. 12.

In a step 357 following the step 356, the fuel injection control signal S34 is adjusted to represent the final desired duration Ti given in the preceding step 356. After the step 357, the program ends and then waits for the next execution cycle.

Figure 15:
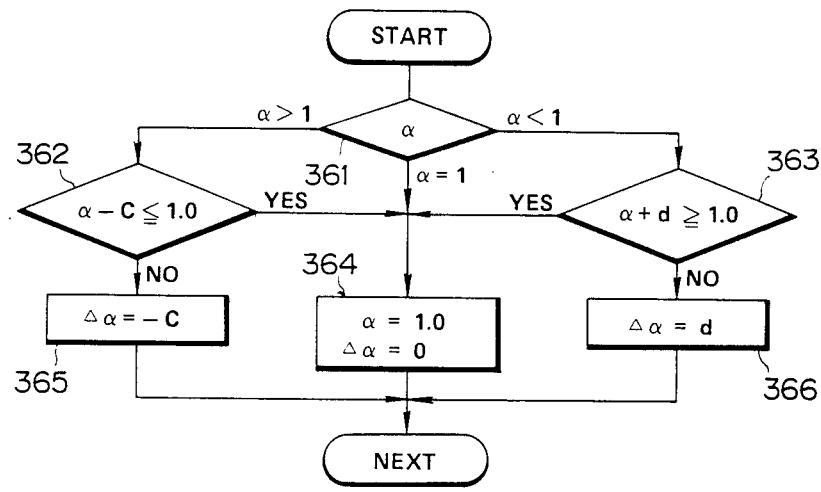
FIG. 15 illustrates the step 354 of FIG. 14 in greater detail.

FIG. 15 illustrates the step 154 in more detail. As shown in FIG. 15, in a first block 361 of the step 354 which follows the step 352 (see FIG. 14), the correction factor $\alpha$ is compared to the value 1.0. If the correction factor $\alpha$ is greater than 1.0, the program advances to a block 362. If the correction factor $\alpha$ is less than 1.0, the program advances to a block 363. If the correction factor $\alpha$ is equal to 1.0, the program advances to a block 364.

In the block 362, the correction factor $\alpha$ minus the constant c is compared to the value 1.0. In other words, the value "$\alpha - c$" is checked to see whether or not it is less than or equal to 1.0. If the correction factor $\alpha$ minus the constant c is equal to or less than 1.0, the program advances to the block 364. If the correction factor $\alpha$ minus the constant c is greater than 1.0, the program advances to a block 365.

In the block 365, the value $\Delta\alpha$ is set to $-c$. In other words, "$\Delta\alpha = -c$" is executed. After the block 365, the program advances to the step 355 of FIG. 14.

In the block 363, the correction factor $\alpha$ plus the constant d is compared to the value 1.0. In other words, the value "$\alpha + d$" is checked to see whether or not it is greater than or equal to 1.0. If the correction factor $\alpha$ plus the constant d is equal to or greater than 1.0, the program advances to the block 364. If the correction factor $\alpha$ plus the constant d is less than 1.0, the program advances to a block 366.

In the block 366, the value $\Delta\alpha$ is set to d. In other words, "$\Delta\alpha = d$" is executed. After the block 366, the program advances to the step 355 of FIG. 14.

In the block 364, the correction factor $\alpha$ is set to the value 1.0 and the value $\Delta\alpha$ is set to zero. In other words, "$\alpha = 1.0$" and "$\Delta\alpha = 0$" are executed. After the block 364, the program advances to the step 355 of FIG. 14.

When the detected peak pressure crank angle is unacceptable, this step 354 serves to adjust the air-to-fuel ratio so that the air-fuel mixture will return from an excessively rich or lean state to an appropriate state.

What is claimed is:

1. A system for an engine including a combustion chamber in which combustion is induced periodically by generating a spark, the system comprising:
   (a) means for sensing pressure within the combustion chamber;
   (b) means for detecting a timing at which the sensed pressure peaks;
   (c) means for measuring an interval between an occurrence of a spark generation and the timing of the pressure peak;
   (d) a memory;
   (e) means for, in accordance with a length of the presently measured interval, selectively storing the presently detected timing of the peak pressure in the memory in place of data held previously in the memory or ignoring the presently detected timing of the pressure peak so as to allow the memory to continue to hold the previously detected timing of the pressure peak, comprising:
      (1) means for deriving a mean value of the periodically measured intervals;
      (2) means for comparing the presently measured interval to a reference value which is related to the mean value of the intervals;
      (3) means for, when the presently measured interval is greater than the reference value, storing the presently detected timing of the pressure peak in the memory; and
      (4) means for, when the presently measured interval is not greater than the reference value, ignoring the presently detected timing of the pressure peak;

(f) means for outputting a signal representing the detected timing currently held in the memory.

2. The system of claim 1, further comprising means for controlling the moment of spark generation in accordance with the timing of the pressure peak represented by the output signal.

3. The system of claim 1, further comprising means for controlling the rate of fuel injection into the engine in accordance with the timing of the pressure peak represented by the output signal.

4. The system of claim 1, further comprising means for outputting a second signal indicating that the storing/ignoring means has continuously been ignoring the detected timings of the pressure peak for a reference interval or for longer than the reference interval.

5. The system of claim 4, further comprising means for controlling the moment of spark generation in accordance with the second signal.

6. The system of claim 4, further comprising means for controlling the rate of fuel injection into the engine in accordance with the second signal.

7. A system for an engine including a crankshaft and a combustion chamber in which combustion is induced periodically with respect to rotation of the crankshaft, the system comprising:
(a) means for sensing pressure within the combustion chamber;
(b) means for periodically detecting an angle of the crankshaft at which the sensed pressure peaks;
(c) means for deriving a mean value of the periodically detected peak pressure crankshaft angles;
(d) means for comparing the presently detected peak pressure crankshaft angle to a reference value which is related to the mean value;
(e) a memory;
(f) means for, in accordance with the comparison between the presently detected peak pressure crankshaft angle and the reference value, selectively storing the presently detected peak pressure crankshaft angle in the memory in place of data held previously in the memory or ignoring the presently detected peak pressure crankshaft angle so as to allow the memory to continue to hold the previously detected peak pressure crankshaft angle; and
(g) means for outputting a signal representing the detected peak pressure crankshaft angle currently held in the memory.

8. The system of claim 7, further comprising means for controlling the moment of spark generation in accordance with the timing of the pressure peak represented by the output signal.

9. The system of claim 7, further comprising means for controlling the rate of fuel injection into the engine in accordance with the timing of the pressure peak represented by the output signal.

10. The system of claim 7, further comprising means for outputting a second signal indicating that the storing/ignoring means has continuously been ignoring the detected timings of the pressure peak for a reference interval or for longer than the reference interval.

11. The system of claim 10, further comprising means for controlling the moment of spark generation in accordance with the second signal.

12. The system of claim 10, further comprising means for controlling the rate of fuel injection into the engine in accordance with the second signal.

* * * * *